Figure 1:
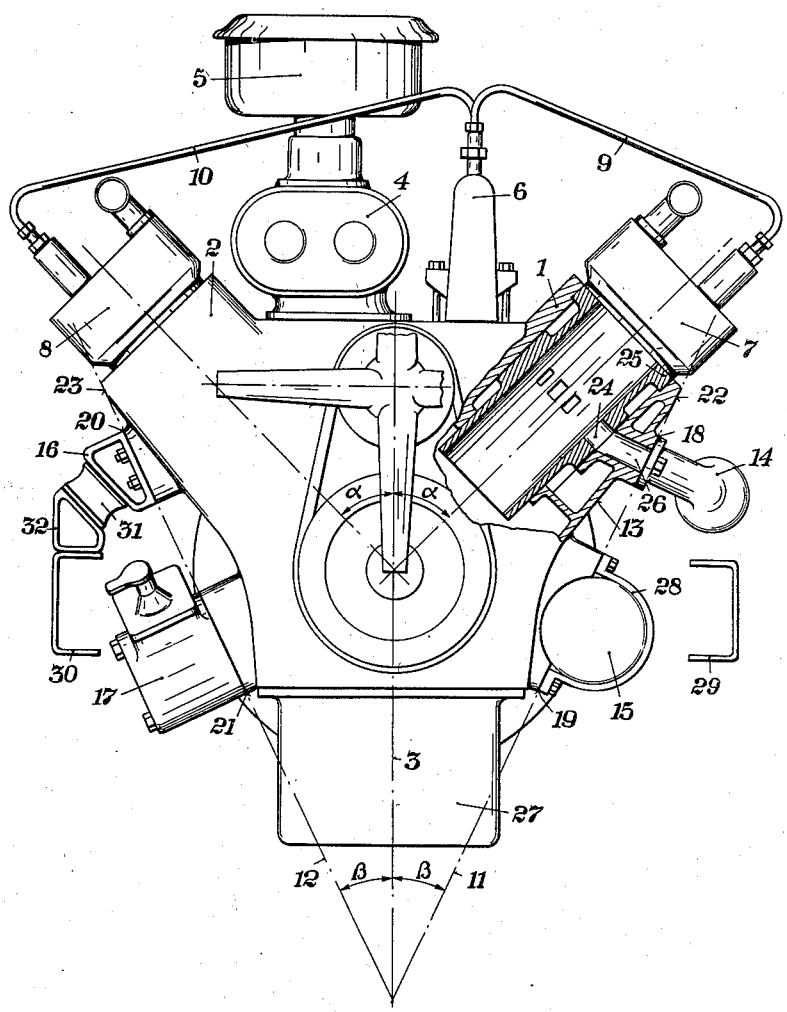

United States Patent Office 2,821,969
Patented Feb. 4, 1958

2,821,969

V-TYPE INTERNAL-COMBUSTION ENGINE HOUSING

Andreas Scheiterlein, Graz, Austria, assignor to Gustav Ospelt, Vaduz, Liechtenstein Application December 23, 1953, Serial No. 399,851

Claims priority, application Austria December 29, 1952

1 Claim. (Cl. 123—55)

The present invention relates to an internal-combustion engine, particularly to a two-stroke internal-combustion engine with cylinders arranged in V-form and with auxiliary machines and auxiliary equipment attached to the outer sides of the crankcase. In port-controlled two-stroke engines of this type it is usual to provide one machined surface on the inclined upper portion and one on the vertical and approximately vertical lower portions on each side of the crankcase for the attachment of the auxiliary machines and auxiliary equipment on the two outer longitudinal sides of the crankcase. The upper machined surfaces have to be provided for the fixation of the exhaust flanges whereas the lower connecting surfaces serve for the fixation of the oil cooler and oil filter, starter, and engine suspension gear.

That construction of the crankcase, however does not meet the requirements of modern methods of manufacture. For the series production of crankcases on plano-millers or circular milling machines it is necessary to provide the least number of machined surfaces, arranged to permit them to be machined in one operation with the largest cutterheads possible.

According to the invention these requirements are met thereby that the several surfaces for the attachment of the auxiliary machines and auxiliary equipment on both outer sides of the crankcase are extended from the crankcase sufficiently and inclined in such a way that they lie in one plane on each side and thus can be machined together.

To enable the absolutely free movement of the machining tool over the surface to be machined, each of the two lateral machining planes freely protrude beyond the crankcase, according to another feature of the invention, so that other protruding parts of the crankcase can be machined too, if desired.

According to a preferred embodiment the angle between each of the two machining planes and the plane of symmetry of the engine is smaller than half the V angle of the engine. In other words, the machining planes are steeper than the axes of the cylinders and positioned between the angular positions of the formerly customary mounting surfaces at the upper and lower portions of the crankcase. In this arrangement the distances between the various mounting surfaces and the crankcase and the length of the exhaust duct will be as small as possible, so that the width of the engine will be minimized too. The specific inclination of the mounting planes also provides for an easier access to the appliances.

The two mounting planes may be at different angles of inclination with the plane of symmetry of the engine and be arranged at different heights. According to a preferred embodiment of the invention, however, it is particularly advantageous from the manufacturing aspect to arrange the machining planes symmetrically with respect to the plane of symmetry of the engine so that the machining planes intersect the plane of symmetry along a common straight line parallel to the crankshaft axis.

To keep the exhaust ducts in the crankcase between the exhaust ports and the mounting surfaces of the exhaust lines as short as possible, preferably without any change of direction, the same are straight and arranged with such inclination that they open into the mounting planes at least approximately at right angles. To this end they are directed with a slight upward deviation from the normal on the cylinder axis.

In engines having auxiliary machines, such as blower, injection pump, dynamo, located in the V-space, the position of the centre of gravity of the engine is relatively high. Since the best location for the suspension gear of the engine is known to be provided when the line of application of force at the points of suspension passes through the centre of gravity of the engine, a high position of the centre of gravity requires a correspondingly high suspension of the engine. The design of the lateral mounting planes according to the invention now provides in a simple manner a possibility for arranging the engine front suspension gear above the crankshaft axis approximately at half the height at the common mounting planes. When the rear suspension gear is arranged in the known manner approximately on the level of the crankshaft axis, the aforementioned requirement regarding the position of the centre of gravity has been fulfilled.

Figure 2:
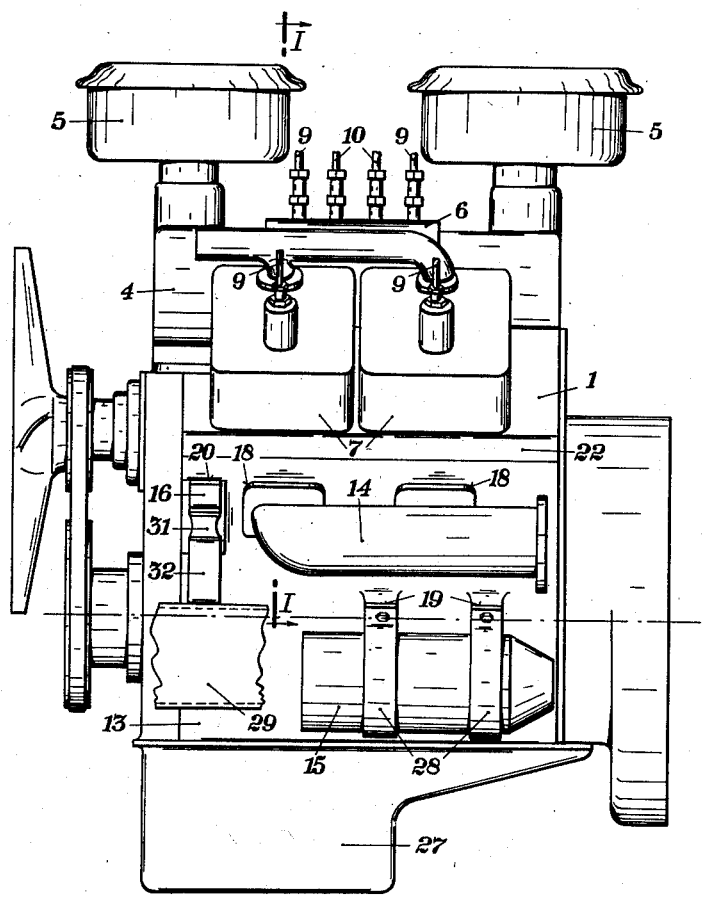

The subject of the invention is explained in greater detail with reference to an illustrative embodiment. Fig. 1 shows a four-cylinder two-stroke V-type engine in front elevation, partly in a section taken along line I—I of Fig. 2; Fig. 2 is a side elevation of that engine.

Each of the two rows of cylinders 1 and 2 is at an angle $\alpha$ with the axis of symmetry 3 of the engine. The V-space between the two rows of cylinders contains the scavenging blower 4, sucking through the air filter 5, and the injection pump 6. The scavenging blower 4 and the injection pump 6 are driven by the crankshaft via transmission elements not shown. The injection lines leading to the cylinder heads 7 and 8 are designated with 9 and 10, respectively.

On each of the outer sides of the crankcase 13 one mounting plane, 11 and 12, respectively, has been provided for the attachment of the exhaust manifolds 14 (only one of which is shown), of the starter 15, the engine suspension gear 16, the oil filter and oil cooler 17, which mounting plane extends relative to the axis of symmetry of the engine at an angle $\beta$, smaller than angle $\alpha$. For absolute freedom of movement of the machining tool over the work during the machining of the mounting planes, the pertinent mounting surfaces 18, 19, 20, 21 are extended sufficiently for the common machining planes 11 and 12, respectively, to protrude freely beyond the crankcase 13. At points 22 and 23 the otherwise protruding edges have been removed. The oil sump is designated with 27. The exhaust ducts 26 leading outwardly from the exhaust ports 24 in the cylinder liners 25, open at right angles into the mounting surfaces 18. The clips serving to attach the starter 15 are designated with 18.

Two longitudinal members 29 and 30 of the vehicle frame, on which the engine is suspended, are shown in section. In front, the suspension gear is symmetrically connected to the outer sides of the crankcase 13, at the two surfaces 20, approximately on the level of the exhaust ports 26. The suspension gear consists at each point of one rubber block 31 and the connecting parts 16 and 32.

What I claim is:

A one-pice housing for an internal combustion engine with cylinders arranged symmetrically and in upwardly diverging V-configuration on opposite sides of a longitudinal plane of symmetry, said housing including a crank case beneath said cylinders and being formed with relatively remotely presented longitudinal sides in angular generally downwardly converging relation, each having a concave cross-section transverse to said plane of symmetry, projections for mounting attachments including the motor supports and exhaust manifolds, said projections being integral with each said side and extending outwardly therefrom, said projections on each side being formed with surfaces in a common plane spaced outwardly from said side, said common planes of the projection surfaces of the respective sides intersecting below and outside of the housing, and said housing being contained entirely between said planes.

References Cited in the file of this patent

UNITED STATES PATENTS

| | | |
|---|---|---|
| 986,982 | Herreshoff | Mar. 14, 1911 |
| 1,021,697 | Mort | Mar. 26, 1912 |
| 1,362,006 | Johnson | Dec. 14, 1920 |
| 2,117,380 | Walters | May 17, 1938 |

FOREIGN PATENTS

| | | |
|---|---|---|
| 230,819 | Great Britain | Jan. 25, 1926 |
| 894,342 | France | Mar. 13, 1944 |
| 856,534 | Germany | Nov. 24, 1952 |